United States Patent [19]

Noakes et al.

[11] 4,067,955

[45] Jan. 10, 1978

[54] METHOD OF FORMING A SILICON CARBIDE ARTICLE

[75] Inventors: Jack E. Noakes, Plymouth Township, Mich.; Hiroshi Sato, West Lafayette, Ind.; Leslie L. Terner, West Bloomfield Township, Mich.

[73] Assignee: Ford Motor Company, Dearborn, Mich.

[21] Appl. No.: 619,428

[22] Filed: Oct. 3, 1975

[51] Int. Cl.$^2$ .............................................. C01B 31/36
[52] U.S. Cl. .................................... 423/345; 264/29.5
[58] Field of Search ................. 423/345, 346; 264/29, 264/63, 65, 66, 328

[56] References Cited

U.S. PATENT DOCUMENTS

| | | | |
|---|---|---|---|
| 2,691,605 | 10/1954 | Hediger | 423/346 |
| 2,938,807 | 5/1960 | Andersen | 264/63 |
| 3,175,918 | 3/1965 | McGanna et al. | 423/345 |
| 3,459,566 | 8/1909 | Wilson, Jr. et al. | 264/29 |
| 3,495,939 | 2/1970 | Forrest | 423/346 |
| 3,718,441 | 2/1973 | Landingham | 264/65 |
| 3,882,210 | 5/1975 | Crossley et al. | 264/328 |
| 3,887,411 | 6/1975 | Goodyear et al. | 264/66 |

FOREIGN PATENT DOCUMENTS

| | | | |
|---|---|---|---|
| 811,647 | 4/1969 | Canada | 423/345 |
| 2,439,930 | 1/1975 | Germany. | |
| 892,340 | 3/1962 | United Kingdom | 423/345 |

OTHER PUBLICATIONS

Special Ceramics - 1973 - Forrest et al. - pp. 99-123.

*Primary Examiner*—Earl C. Thomas
*Assistant Examiner*—Eugene T. Wheelock
*Attorney, Agent, or Firm*—William E. Johnson; Keith L. Zerschling

[57] ABSTRACT

A method of forming a silicon carbide article is disclosed. Selected weight percentages of silicon carbide particles, graphite particles, if desired, and a thermosetting binder are mixed together and molded into an article by molding techniques which operate on the basis that the thermosetting binder forms a continuous medium about all the particles supported therein. The molded article is heated in the absence of oxygen and the thermosetting binder breaks down to form a low density, vitreous carbon phase. The article is heated in the absence of oxygen to a selected temperature at which the article is maintained for a period of time in a gaseous environment consisting of nitrogen preferably with a small amount of hydrogen therein. The hydrogen-nitrogen treatment is effective to cleanse the article and insure that there is an adequate pore structure through the article for a later siliciding operation to be carried out thereon. The article is silicided at an elevated temperature by penetration of the article through its pore structure with a reactable form of silicon.

4 Claims, No Drawings

METHOD OF FORMING A SILICON CARBIDE ARTICLE

BACKGROUND OF THE INVENTION

In recent years there has been much interest in fabrication of articles of complex shape from silicon carbide. One particular area of interest has been the forming of complex shaped articles for gas turbine engine application from silicon carbide as this material is capable of withstanding temperatures substantially higher than the temperatures which can be withstood by present day super alloys used in gas turbine engines. When such turbine engines are operated at higher temperatures, such as the temperatures which can be used with silicon carbide components in a gas turbine engine, they become much more efficient by giving a greater amount of power for the same fuel consumption.

In attempting to form silicon carbide articles of complex shape, injection molding processes have been developed. In general, these molding processes are carried out by mixing silicon carbide particles, and optionally graphite particles, with a predetermined amount of a thermosetting binder. The article is formed in an injection molding operation, removed from the mold and subjected to heat in the absence of oxygen to reduce the thermosetting binder to carbon. The article is silicided to transform the carbon and any graphite present to silicon carbide thereby to produce a finished article of silicon carbide. A process for producing such an article is disclosed in U.S. Patent Application Ser. No. 389,770 filed Aug. 20, 1973 in the name of Douglas R. Fitchmun and assigned to the assignee of this application, which application is hereby incorporated by reference.

We have found that the prior art processes of siliciding an injection molded article containing silicon carbide and a thermosetting binder had some drawbacks. In particular, the prior art processes were slow, generally did not produce an article which was fully silicided, and were difficult to perform on a body having any substantial thickness within a reasonable period of time. We have recovered three principal reasons why the prior art siliciding processes had such difficulty.

One principal difficulty is that almost all commercially available silicon carbide powder has some silicon dioxide contained therein. This silicon dioxide is not wetted by molten silicon metal thus making a siliciding operation on an article containing this material difficult.

Another reason that the prior art processes had some difficulty in achieving a fully dense silicon carbide article is that the prior art process did not try to adjust the total amount of carbon in the article after both its formation and heating to break down the thermosetting binder into carbon. In other words, the prior art did not recognize that if more carbon was present in the article after pyrolyzing thereof than pore volume available for growth of new silicon carbide, when silicon reacted with the carbon to form silicon carbide, the result would be that the reaction would close off the pores and carbon remaining in the interior of the article would not be reached by the silicon. In such a case the surface of the article would be formed of substantially pure silicon carbide and the interior volume would be a mixture of the original silicon carbide particles and unreacted carbon.

Still another difficulty found in the prior art processes is that the prior art processes did not control the onset of the siliciding operation by application of a gaseous pressure of nitrogen to coincide with a point at which the article is be silicided was both at a proper siliciding temperature and was properly cleaned. The article is properly cleaned when all of the silicon dioxide is removed therefrom and its pore structure adjusted so that the pore volume of the article is sufficient to permit penetration of the article with a reactable form of silicon and a reaction of that silicon with all available carbon present in the article.

SUMMARY OF THE INVENTION

This invention is directed to a method of forming a silicon carbide article, and, more particularly, to a method of forming a silicon carbide article in which the article is generally uniformly silicided throughout its entire volume in a relatively rapid manner.

In accordance with the teachings of this invention a silicon carbide article is formed by carrying out the following process. A flow molding mixture is formed by mixing together 60 to 80 percent, preferably 65 to 75 percent, by weight of silicon carbide particles having an average particle size in a range from about 40 microns to less than about one micron; and 40 to 20 percent, preferably 35 to 25 percent, by weight of a thermosetting binder which produces a flowable liquid phase when melted and which produces carbon upon nonoxitive pyrolysis. Up to 7 percent by weight graphite particles having an average particle size in a range from about 10 to 0.1 microns may be substituted for a portion of the silicon carbide particles and thermosetting binder. A mold release agent may also be employed in the mixture.

The molding mixture is heated to a temperature whereat the thermosetting binder is a liquid. The mixture is then molded into an article by an injection molding technique which operates on the basis that the liquified thermosetting binder forms a continuous medium about the silicon carbide particles and graphite particles, if present, so that the mixture is moldable as if it were a liquid. Once the article has been formed in the molding operation and the thermosetting material is stiffened, the article is removed from the mold and pyrolyzed in the absence of oxygen. In this heating process, the thermosetting binder undergoes a volumetric reduction in breaking down to form a low density vitreous carbon phase. Such action develops a generally interconnected pore structure throughout the article.

The porous article is heated in the absence of oxygen to a siliciding temperature above the melting temperature of silicon. The article is maintained, once it is heated to a temperature of at least 2800° F, for a period of time in a gaseous environment consisting principally of nitrogen with from 0 to 10 percent, preferably 3 to 7 percent, hydrogen contained therein. The hydrogen, if present, reacts with the porous article to remove carbon therefrom so that the article has sufficient free volume to accommodate the growth of silicon carbide when the carbon is subjected to a siliciding operation. In this dual gas treatment, the nitrogen reacts with any oxides of silicon present in the silicon carbide to transform it into silicon nitride. Nitrogen also reacts with clean silicon surfaces to form silicon nitride. This dual gas treatment accomplishes two major functions, one of cleaning up the article by removing oxides of silicon and the other of insuring that sufficient free volume is available within the article so that the carbon may be transformed into silicon carbide in a manner which does not prematurely seal off the pore structure of the article.

The dual nitrogen-hydrogen atmosphere is withdrawn from association with the article prior to a siliciding operation. The article is brought to its siliciding temperature with some nitrogen gas surrounding the same. This nitrogen gas is replaced by a vacuum lower than the vapor pressure of silicon at the siliciding temperature. Following withdrawal of the nitrogen atmosphere, the silicon nitride formed in the article by the action of the nitrogen on the oxides of silicon and on clean silicon surfaces gives up the nitrogen reacted therewith and is transformed to silicon metal. The now clean article is silicided at an elevated temperature by permitting penetration of the article through its pore structure with a reactable form of silicon. This silicon reacts with the available carbon to form silicon carbide.

The siliciding of the article can be carried out by introducing silicon metal into the chamber containing the article when a nitrogen containing environment surrounds the article. This nitrogen containing environment may be either some nitrogen hydrogen gases or pure nitrogen by itself. The article is brought in the presence of the nitrogen containing environment to its siliciding temperature in a range from the melting temperature of silicon to 3300° F. The nitrogen containing environment is withdrawn when the siliciding temperatures is reached thereby leaving behind silicon metal in a form which penetrates the pore structure of the article and rapidly reacts with the available carbon and graphite, if present, of the article. While the nitrogen environment is present in the chamber holding the article, the nitrogen reacts with the liquid silicon metal to form a silicon nitride skin thereon which stops any penetration of the porous body by the silicon in any form.

As stated above, graphite particles may be mixed with the molding mixture in order to provide another source of reactable carbon in the molded article. If graphite is present in the article, some of the thermosetting binder during the nonoxitive pyrolysis operation will shrink about individual particles of graphite. When the article is subsequently subjected to the hydrogen-nitrogen treatment, the hydrogen eliminates a portion of the graphite thus making pores in the vitreous carbon formed about the graphite particles.

DESCRIPTION OF THE PREFERRED EMBODIMENTS

The method of this invention will be demonstrated in the discussion thereof set forth below. The particular materials mentioned in the discussion are not intended to limit the scope of this invention. Any thermosetting polymeric material which originally contains aromatic components or produces such aromatic components upon pyrolysis and is in a flowable liquid phase at temperatures of a plastic molding operation is suitable for use in this method of forming silicon carbide articles by injection molding.

The method of the invention is initiated by mixing together 60 to 80 percent, preferably 65 to 75 percent, by weight of silicon carbide particles. These silicon carbide particles should have an average particle size in a range from about 40 microns down to less than about 1 micron. Such silicon carbide material is commercially available and is generally alpha silicon carbide. The higher amounts of silicon carbide particles in a mixture can be obtained when the larger particle sizes are used. As the average particle size is reduced towards the lower particle size limit, the amount of silicon carbide which can be loaded into a mix and still be totally surrounded by a liquified thermosetting material with the particles not contacting one another is reduced. This comes about, of course, because for the same given weight of material the smaller particles have a larger surface area to be wet than do the larger particles.

The silicon carbide particles are mixed with 40 to 20 percent, preferably 35 to 25 percent, by weight of a thermosetting binder which produces a flowable liquid phase when melted and which produces carbon upon nonoxitive pyrolysis. The carbon is produced when the thermosetting material breaks down upon pyrolysis to form aromatic components. These aromatic components subsequently form a vitreous, low density carbon phase. Some thermosetting materials which are satisfactory for use in the method of this invention are the following: phenol furfural, phenol formaldehyde, polybenzimindazole, phenolicnaphthalenediol terpolymer, polyphenylenes, polyvinyl chloride, polyvinylidiene chloride and polyphenol polymer. At room temperatures these materials are generally in a solid state, but when they are heated to a temperature of an injection molding operation, they melt and produce a liquid phase.

If desired, graphite particles may be added to the molding mix. If these particles are added, they are added up to 7 percent by weight of the mix. If graphite is used, it mainly displaces the silicon carbide particles but it also displaces a small amount of the thermosetting binder. For molding mix quantities, when 0 to 7 percent by weight of graphite is used, the broad limits are 60 to 75 percent by weight of silicon carbide particles and 40 to 23 percent by weight of the thermosetting material. Also, the graphite particles should have an average particle size in a range from about 10 to about 0.1 microns. Graphite particles having an average particle size of around 0.5 microns are preferred.

No matter what combination of materials are used in forming the molding mixture, the essential feature is that sufficient theremosetting material is present with the particles that when the thermosetting binder is liquified, it forms a continuous phase about the particles which are suspended therein. This allows the molding mixture to be injection molded by flow molding techniques.

After the molding mixture has been formed, the mixture is heated to a temperature at which the thermosetting binder is in a liquid phase. The liquid phase must completely surround the individual silicon carbide particles and any graphite particles present. The thermosetting material must form a continuous phase about these particles so that the molding mixture is a flowable mass which can be injection molded.

The mixture is injection molded by forcing it under pressure in an injection molding machine into a mold. Such an injection molding technique operates on the basis that the flowable thermosetting binder forms a continuous phase about the particles contained therein. Since the mixture is a flowable mass, the mold into which it is injection molded can be of a complex shape. For example, the mold may define the shape of a rotor or a stator of a gas turbine engine.

After this molding operation, the thermosetting binder is stiffened by permitting the material sufficient time in the mold that the thermosetting material crosslinks. This stiffening lends strength to the molded article so that it may be removed from the mold without damage thereto.

This molded article is then subjected to a pyrolyzing operation in the absence of oxygen. Under these conditions, the thermosetting binder in the molded article undergoes a volumetric reduction in breaking down to form a vitreous carbon phase. A portion of the thermosetting material is driven off as volatile matter but a portion of its remains behind by forming aromatic components which subsequently form carbon. The carbon formed is a vitreous carbon phase which serves to bond the silicon carbide particles and any graphite particles present together. With respect to the smaller graphite particles, the vitreous carbon may surround portions thereof.

The pyrolyzing action develops a generally interconnecting pore structure throughout the article as a result of the volumetric reduction of the thermosetting material. The pyrolyzing operations may be carried out at a final temperature in any manner which accomplishes the intended function. The heating and cooling rates should be such that no substantial stresses are set up in the article which might cause damage thereto. A typical pyrolyzing operation is one which is carried out by heating the article from room temperature to 700° F at a rate of about 50° F per hour, from 700° F to 1200° F at a rate of about 25° F per hour, and from 1200° F to a final temperature in a range of from 1850° to 2500° F at a rate of 50° F per hour. The article may be cooled back to room temperature at a rate of about 150° F per hour.

After the pyrolyzing operation, the article may be cooled to room temperature, if desired, and then subsequently reheated so that it may be silicided in a separate operation. On the other hand, the article may be brought from the pyrolyzing operation directly to a temperature for the siliciding operation. Generally, the article is cooled to room temperature and reheated as it is silicided in a different furnace than that in which it is pyrolyzed.

After pyrolyzing, the article is heated in the absence of oxygen to a siliciding temperature which is generally a temperature above the melting point of silicon but less than 3300° F. The article may be heated at any heating rate which does not cause substantial thermal stresses to be set up therein thus possibly leading to damage to the article. For example, a heating rate of about 200° F per minute is satisfactory. A lower siliciding temperature, for example just above the melting point of silicon, is used for small articles. A higher siliciding temperature is used for articles of larger cross section. In either case, a siliciding of the article is obtained in a relatively short period of time. For example, an article having a thickness of a quarter of an inch can be silicided in a period of less than one minute whereas an article having a thickness of 1 inch can be silicided in one minute.

As one of the important steps of the process of this invention, while the article is being brought to its siliciding temperature, the article is maintained for a period of time at a temperature of at least 2800° F in a gaseous environment consisting principally of nitrogen with from 0 to 10 percent, preferably 3 to 7 percent, hydrogen by volume. This dual atmosphere of nitrogen and hydrogen is maintained about the article at a pressure less than one-quarter atmosphere. The temperature of treatment may be any temperature above 2800° F. Below 2800° the treatment's effectiveness is reduced substantially. The period of time for which the article is held in the dual gas treatment is determined by the amount of carbon material which must be removed from the article. For example treatment time may be from 15 minutes to 2 hours.

This dual gas treatment is an effective way of cleaning up the article prior to the siliciding operation. The cleaning up comes about in that the hydrogen is active in removing some of the carbon and some of the graphite if any is present in the article. This action develops sufficient free volume in the article to accommodate conversion of the article's remaining carbon and any graphite to silicon carbide. One may determine the amount of time that the article should be subjected to the dual gas treatment by knowing (1) the amount of graphite in the article, (2), the amount of carbon in the article produced by decomposition of the thermosetting material, and (3) the pressure of the gas and amount of hydrogen present to react with the carbon. If the article is rich in silicon carbide particles and has a relatively low amount of carbon produced by decomposition of the thermosetting material, the time of dual gas treatment is reduced. Hydrogen also aids in clearing up oxides of silicon in the silicon carbide powder.

The nitrogen of the dual gas treatment reacts with any oxides of silicon present in the silicon carbide particles. Oxides of silicon, such as silicon dioxide, are found in almost all commercially sold silicon carbide powders. The nitrogen reacts with the oxides of silicon to transform them into silicon nitride. Silicon nitride is generally unstable at these temperatures but in the presence of nitrogen it does not break down. However, when a vacuum is drawn on the system, the silicon nitride breaks down to give off the nitrogen and the silicon remains behind as pure silicon.

In a situation where graphite particles are used in the mixture, the thermosetting binder which was thermally decomposed may form about some of these graphite particles. The dual gas treatment eliminates a portion of the graphite particles thus placing a pore in any of the vitreous carbon which may have been formed thereabout. Thus, additional pores can be developed in the dual gas treatment if graphite particles have been used in the initial mixture.

As a result of the dual gas treatment, the article is now cleansed of silicon oxides as well as having a very well developed pore structure therein. The pore structure is sufficient to accommodate the conversion of the remaining carbon and any graphite to silicon carbide. The silicon for accomplishing this transformation is permitted entry into and penetration of the article because of its open and adequate pore structure.

The nitrogen-hydrogen environment can remain while the article is brought to its siliciding temperature or it can be replaced by a substantially pure nitrogen environment which surrounds the article. This environment around the article being brought to its siliciding temperature is maintained at a pressure less than one quarter atmosphere. If a lower siliciding temperature is to be used than the temperature of the dual gas treatment, the article may actually be cooled off to be brought to its siliciding temperature. However, if a higher siliciding temperature is to be used, the article is heated to the siliciding temperature at a rate which does not cause any thermal distortions therein. For example, if the article has been treated at 2850° F for the dual gas treatment and the siliciding temperature is to be 3150° F, the article might be heated at a rate of 200° F per minute to the higher temperature.

In order to carry out the siliciding operation, it is necessary to make available in the vicinity of the article pure silicon metal. This metal may be introduced into the chamber through appropriate apparatus already known in the art at a time when the nitrogen containing environment is present and the article is being brought to its siliciding temperature. On the other hand, if desired, the silicon may be made available to the article after the article has achieved its siliciding temperature. It is preferred, however, to introduce the silicon adjacent to the article at the time that the article is being heated in a nitrogen containing environment to its siliciding temperature.

The temperature of the chamber in which the article is resting is above the melting point of the silicon metal which is introduced into the chamber as a solid metal. If a nitrogen atmosphere is present, the silicon will first melt and as it does so, a thin skin of silicon nitride will form thereover by the action of the nitrogen on the silicon. The silicon is disabled in this manner from reacting with the carbon and graphite in the article because of the formation of this skin. We have found that it is important to keep the silicon from reacting with the article until the article is at its siliciding temperature.

Once the article has been brought to its siliciding temperature, the nitrogen containing environment surrounding the same is replaced with a vacuum insert in which the total absolute pressure on the article and the silicon is lower than the vapor pressure of the liquid silicon at the siliciding temperature. By drawing this vacuum having a total absolute pressure lower than the vapor pressure of silicon, some of the silicon volatilizes into the atmosphere surrounding the article and thereby enters the pore structure of the article. It is apparent that the higher the temperature, the higher the vapor pressure of the silicon metal and the less vacuum needed on the system. For example, higher vacuums are needed to accomplish the volatilization of the silicon metal at temperatures closer to the melting point of the silicon. The drawing of the vacuum initially operates on the unstable silicon nitride skin to break it down and leave pure silicon behind. Likewise the drawing of the vacuum also strips the nitrogen from the silicon nitride formed when the nitrogen reacted with oxides of silicon in the silicon carbide. This also leaves behind pure silicon.

When the skin of silicon nitride has been removed from the molten silicon metal, the silicon in a reactable state penetrates the article through its pore structure. This silicon reacts with the carbon developed as a result of decomposition of the thermosetting material and it also reacts with any graphite that is present in the article to transform the same into silicon carbide. The controlling of the onset of siliciding as well as the siliciding of a body which has been cleansed in the dual gas treatment allows the process to proceed at a very rapid rate. For example, as described above, the siliciding of a body of ½ inch thickness would take less than one minute whereas the siliciding of a 1 inch thick section would take about one minute. However, the silicon treatment may remain in effect for a period of time up to 30 minutes or more to insure that all carbon in the article is converted to silicon carbide. The completed silicon carbide article is generally of almost theoretical density of 3.21 g/cc.

The finished article is recovered by cooling the article to room temperature at a rate which does not cause any thermal fracturing of the material. For example, the furnace may be turned off and allowed to cool back to room temperature with the article therein.

What we claim is:

1. In a method of forming a silicon carbide article: (a) wherein 60–80% by weight of silicon carbide particles having an average particle size in the range from about 40 microns to less than 1 micron are mixed together with 40–20% by weight of a thermosetting binder which produces a flowable liquid phase when melted and which produces carbon upon nonoxidative pyrolysis, said silicon carbide particles also having oxides of silicon present therein as an impurity; (b) wherein the mixture is heated to a temperature whereat the thermosetting binder is in a liquid phase; (c) wherein the mixture is injection molded by an injection molding technique to form an article, the injection molding technique operating on the basis that the flowable thermosetting binder forms a continuous phase about the silicon carbide particles supported therein; (d) wherein the thermosetting binder is stiffened to lend strength to the molded article so that it may be removed from its mold; (e) wherein the molded article is pyrolized in the absence of oxygen so that the thermosetting binder undergoes a volumetric reduction while breaking down to form a vitreous carbon phase which serves to bond silicon carbide particles together, this action also developing pores throughout the article; and (f) wherein the article is silicided at an elevated temperature by permitting the penetration of the article through its pores with silicon which reacts with the vitreous carbon to form silicon carbide; the improvement which comprises by addition of a new step between steps (e) and (f), a step which comprises:

treating the article after it has been pyrolized and prior to the siliciding thereof by maintaining the article once it has been heated to a temperature of at least 2800° F for a period of time in a gaseous environment consisting of a nitrogen-hydrogen atmosphere in a range of from 3% by volume to 7% by volume hydrogen whereby the hydrogen reacts with some of the vitreous carbon phase in the article to remove a portion of the carbon in the article and insure that volume is available in the article to accommodate conversion of the article's remaining carbon to silicon carbide, and whereby the nitrogen reacts with oxides of silicon present in the article to transform the oxides to silicon nitride.

2. The method of claim 1 wherein: the article is maintained in the hydrogen-nitrogen atmosphere for a period of at least 30 minutes.

3. In a method of forming a silicon carbide article: (a) wherein 60–75% by weight of silicon carbide particles having an average particle size in the range from about 40 microns to less than 1 micron and 0 to 7% by weight of graphite having an average particle size in the range from about 10 to 0.1 microns are mixed together with 40–23% by weight of a thermosetting binder which produces a flowable liquid phase when melted and which produces a carbon upon nonoxidative pyrolysis, said silicon carbide particles also having oxides of silicon present therein as an impurity; (b) wherein the mixture is heated to a temperature whereat the thermosetting binder is in a liquid phase; (c) wherein the mixture is injection molded by an injection molding technique to form an article, the injection molding technique operating on the basis that the flowable thermosetting binder forms a continuous phase about the silicon carbide particles supported therein; (d) wherein the thermosetting binder is stiffened to lend strength to the molded article so that it may be removed from its mold;

(e) wherein the molded article is pyrolized in the absence of oxygen so that the thermosetting binder undergoes a volumetric reduction in breaking down to form a vitreous carbon phase which serves to bond the silicon carbide particles together, this action also developing pores throughout the article; and (f) wherein the article is silicided at an elevated temperature by permitting the penetration of the article through its pores with silicon which reacts with the vitreous carbon to form silicon carbide; the improvement which comprises by addition of a new step between steps (e) and (f), a step which comprises:

treating the article after it has been pyrolized and prior to the siliciding thereof by maintaining the article once it has been heated to a temperature of at least 2800° F for a period of time in a gaseous environment consisting of a nitrogen-hydrogen atmosphere in a range of from 3% by volume to 7% by volume hydrogen whereby the hydrogen reacts with some of the vitreous carbon phase in the article to remove a portion of the carbon in the article and insure that volume is available in the article to accommdate conversion of the article's remaining carbon to silicon carbide, and whereby the nitrogen reacts with oxides of silicon present in the article to transform the oxides of silicon to silicon nitride.

4. The method of claim 3 wherein: the article is maintained in the hydrogen-nitrogen atmosphere for a period of at least 30 minutes.

* * * * *